US007142579B2

(12) United States Patent
Chou et al.

(10) Patent No.: US 7,142,579 B2
(45) Date of Patent: Nov. 28, 2006

(54) APPARATUS FOR PROVIDING HIGH QUALITY AUDIO OUTPUT BY MEDIAN FILTER IN AUDIO SYSTEMS

(75) Inventors: Chih-Sheng Chou, Ping-Tung Hsien (TW); Chat-Chin Quek, Hsin-Chu (TW)

(73) Assignee: Syncomm Technology Corp., Hsin-Chu (TW)

( * ) Notice: Subject to any disclaimer, the term of this patent is extended or adjusted under 35 U.S.C. 154(b) by 831 days.

(21) Appl. No.: 10/248,108

(22) Filed: Dec. 19, 2002

(65) Prior Publication Data

US 2003/0153295 A1 Aug. 14, 2003

(30) Foreign Application Priority Data

Feb. 8, 2002 (TW) ............................... 91102551 A

(51) Int. Cl.
*H04B 1/69* (2006.01)
*H04B 7/00* (2006.01)

(52) U.S. Cl. ....................................... 375/130; 455/507

(58) Field of Classification Search ................ 375/130, 375/240.02; 455/507, 3.01, 59, 132; 700/94
See application file for complete search history.

(56) References Cited

U.S. PATENT DOCUMENTS 6,466,832 B1 * 10/2002 Zuqert et al. ................. 700/94
6,671,325 B1 * 12/2003 Lee et al. ................... 375/259

* cited by examiner

*Primary Examiner*—Khai Tran
(74) *Attorney, Agent, or Firm*—Winston Hsu

(57) ABSTRACT

An apparatus includes a receiving circuit, a demodulation module, a frame synchronization control module, a filter, and an audio conversion device. The receiving circuit is used to receive a radio frequency signal and generate a corresponding baseband signal. The demodulation module is electrically connected to the receiving circuit for demodulating the baseband signal and for correspondingly outputting sequential data. The frame synchronization control module is electrically connected to the demodulation module for synchronizing the data and outputs the sequential data. The filter is electrically connected to the frame synchronization control module for filtering out erroneous data outputted from the frame synchronization control module. The audio conversion device is connected to the filter for transferring an output of the filter into a corresponding audio signal.

25 Claims, 5 Drawing Sheets

APPARATUS FOR PROVIDING HIGH QUALITY AUDIO OUTPUT BY MEDIAN FILTER IN AUDIO SYSTEMS

BACKGROUND OF INVENTION

1. Field of the Invention

The present invention relates to an apparatus for enhancing audio quality in audio systems, specifically, an apparatus for providing high quality audio output by a median filter in audio systems.

2. Description of the Prior Art

Sounds are a fundamental way in which people communicate with others. Regardless, if it is voice or music, all are sent by sounds. As new technologies are developed progressively, sounds remain an important way for people to communicate or relax. Products such as audio systems are important products for people to enjoy music and relax. This is especially true of wireless audio systems. The most convenient way to transmit sounds is via air transmission. However, there are also problems with wireless audio systems, and these problems can arise because audio signals are easily influenced by noise during the wireless transmission process. The distorted signals generate popping sounds, subsequently decreasing acoustic fidelity. Therefore, an important research target is to decrease the effect of distorted signals during the wireless transmission process.

Please refer to FIG. 1, which is a functional block diagram of a prior art wireless audio system 10. The wireless audio system 10 includes a transmitting apparatus 12A and a receiving apparatus 12B. The transmitting apparatus 12A is used to transform an audio signal into a radio frequency signal and send the radio frequency signal via air transmission. The receiving apparatus 12B is used to receive the radio frequency signal and transmit the audio signal, which corresponds to said radio frequency signal. The transmitting apparatus 12A comprises two sound inputting devices 14A, 14B, a parallel/serial converter 16, an encoder 18, a burst mode controller (BMC) 19, a modulation module 20, and a transmitting circuit 22. The receiving apparatus 12B comprises a receiving circuit 24, a demodulation module 26, a BMC 28, a decoder 30, a serial/parallel converter 32, two audio conversion devices 34A, 34B, and two speakers 38A, 38B.

In the prior art transmitting apparatus 12A, the sound inputting devices 14A, 14B have a microphone and an analog-to-digital converter (ADC) installed in them. The sound inputting devices 14A, 14B can simultaneously receive two sounds inputted by different audio channels (such as left audio channel or right audio channel). These sounds are recognized as digital data bits (a sample value of each data bit represents an amplitude of the sound) so as to compile sequential digital signals Pa, Pb. The digital signals Pa, Pb are simultaneously transmitted to the parallel/serial converter 16. The parallel/serial converter 16 can encapsulate the two digital signals Pa, Pb of the two sound inputting devices 14A, 14B into a sequential digital signal P1 and output the digital signal P1 to the encoder 18. The encoder 18 adds an error protection code to the digital signal P1. The BMC 19 controls the clock of the digital signal P1 and synchronizes the digital signal P1 so as to form a digital signal P2. The digital signal P2 is transmitted to the modulation module 20. The modulation module 20 modulates the digital signal P2 into an analog baseband signal P3 which is capable of being transmitted via air transmission. The analog baseband signal P3 is sent to the transmitting circuit 22. The transmitting circuit 22 modulates the analog baseband signal P3 into radio frequency signal P4 and transmits the radio frequency signal via air transmission.

After receiving the radio frequency signal P4' (the corresponding received radio frequency signal relates to P4)transmitted from the transmitting apparatus 12A, the receiving circuit 24 transforms the radio frequency signal P4' into a baseband signal P5 (the baseband signal P5 corresponds to the original baseband signal P3) and sends the baseband signal P5 to the demodulation module 26. Note that owning to essence of radio transmittion, P4' may be effected by signal distortion, signal interference, noise, etc. Thus, P4 and P4' may not be exactly the same. The demodulation module 26 extracts the digital data P6 from the baseband signal P5. The BMC 28 controls the clock of the digital data P6 and synchronizes the digital data P6 so as to generate digital data P7. The digital data P7 corresponds to the original digital data P2. The serial/parallel converter 32 splits the digital data P7 into two digital data Pc, Pd originally identified with the different audio channels. The digital data Pc, Pd corresponding to the digital data Pa, Pb are simultaneously transmitted to audio conversion devices 34A, 34B of different audio channels. The audio conversion devices 34A, 34B are a digital-to-analog converter (DAC). The audio conversion devices 34A, 34B convert the digital signal into analog audio signals Pe, Pf and send the analog audio signals Pe, Pf to the speakers 36A, 36B. The speakers 36A, 36B transmit the acoustic wave corresponding to the analog audio signals Pe, Pf so users are able to hear the sound.

Please refer to FIG. 2, which is a clock diagram of the signals of the audio system 10 shown in FIG. 1. The horizontal axis represents time. The vertical axis of the waveform of the audio signal Pe represents amplitudes. In the transmitting apparatus 12A of the audio system 10, an analog audio wave is sampled as digital signals and transformed into an analog radio frequency signal. This analog radio frequency signal is transmitted via air transmission. When the receiving apparatus 12B receives the analog radio frequency signal, the analog radio frequency signal is reconverted into an analog audio signal. The speakers convert the analog audio signal into an acoustic wave and transmit the acoustic wave so users can hear the sound of the acoustic wave. The single audio channel in audio conversion device 34A will be used as an example. The digital signal Pc (Pc corresponds to the digital signal Pa of the transmitting apparatus 12A) uses the one-by-one sequential data samples to represent the amplitude of the radio frequency analog audio signal Pe waveform on each data sample point. As shown in FIG. 2, a data PS1 (always consisting of eight bits) within the digital signal Pc corresponds to the amplitude of the audio radio frequency signal Pe waveform at time t1. Similarly, another data PS2 within the digital signal Pc corresponds to the amplitude of the audio signal Pe at time t2, and a data PS8 corresponds to the amplitude of the audio signal Pe at time t8. The audio conversion device 34A is used to sequentically transform data within the digital signal Pc into the amplitude of the analog waveform so as to transmit the audio signal Pe.

However, the abovementioned the analog signals are influenced by other radio signals or noise when the analog signals are transmitted via air transmission. The analog signals are influenced by the multi-path effect, meaning that some distortions may occur in the analog signal. When the distorted analog signal is received by the receiving apparatus 12B, the corresponding digital signals Pc, Pd may also have some errors. This erroneous information causes the audio conversion device to emit popping sounds. As shown in FIG. 2, if the data sample PS8 at time t8 has a bit error occurrence, the audio signal Pe at time t8 suddenly appears as a high (or low) impulse so the original smooth audio signal Pe appears to have a suddenly change in waveform. This impulse causes users feel uncomfortable, and decreases the quality of the acoustic fidelity.

In order to prevent the above situation from happening, the prior art technology uses the error protection code to encode the sending signal so as to prevent the error of data. In the transmitting apparatus 12A, the encoder 18 encodes the error protection code in each data of the digital signal P1 according to a coding theorem, so as to form the digital signal P1". When the receiving apparatus 12B receives the signal with the error protection code, the receiving apparatus 12B transforms the signal into the digital signal P7 and transmits the digital signal P7 to the decoder 30. The decoder 30 corrects the erroneous bits generated during the wireless transmission process according to the error protection code. See FIG. 2, there is a corresponding error protection code in each data of the digital signal P7. For example, a corresponding error protection code e1 is added to the data PS1, and a corresponding error protection code e2 is added to the data PS2, and so on. The decoder 30 corrects the error of the digital signal according to the error protection code within the digital signal P7, so as to obtain the digital signal P8. The digital signal P8 includes the sample value of each data sample. The digital signal P8 is reconverted into an analog audio signal by the serial/parallel converter 32 and the audio conversion devices 34A, 34B.

A primary defect of the prior art is that the prior art wireless audio systems must have complicated encoders and decoders installed. In order to encode the error protection code, the prior art transmitting apparatus 12A must have the encoder 18 installed and the prior art receiving apparatus 12B must have the corresponding decoder 30 installed. Since the encoding algorithms and the decoding algorithms are complicated, the related encoder 18 and decoder 30 must have complex circuits. This is especially true for the decoder 30. The circuit of the decoder 30 is the most complicated of the components in the receiving apparatus 12B. Therefore, the cost and time of design, production, and maintain of the prior art audio system 10 is increased. Additionally, each data becomes longer after having the error protection code added, thereby increasing the data processing load of the audio system 10.

SUMMARY OF INVENTION

It is therefore a primary objective of the present invention to provide an apparatus that uses a median filter to filter out errors in digital signals so as to provide high quality audio output. The prior art encoder and decoder are no longer required in the said invention, thereby decreasing cost of the audio system.

The claimed median filter compares the filtering data with at least one former data and at least one latter data. Abandoning the maximum sample value data and the minimum sample value data so as to obtain the median value data and output the median value data. Therefore, the median filter can efficiently filter out the erroneous data, which will generate the popping sounds. In the embodiment of this invention, the median filter compares the filtering data with one former data and one latter data. The median filter obtains the median value data within the three successive data samples and outputs the median value. This invention will efficiently filter out the erroneous data and prevent the popping sounds, and decrease the cost of the audio system.

Briefly, the claimed invention discloses an apparatus for enhancing audio quality of an audio system. The apparatus comprises a receiving circuit, a demodulation module, a frame synchronization control module, a filter, and an audio conversion device. The receiving circuit is used to receive a radio frequency signal and generate a corresponding baseband signal. The demodulation module is electrically connected to the receiving circuit, and is used to demodulate the baseband signal and correspondingly output sequential data. The frame synchronization control module is electrically connected to the demodulation module, and is used to synchronize the data and outputs sequential data. The filter is electrically connected to the frame synchronization control module, and is used to filter out erroneous data transmitted from the frame synchronization control module. The audio conversion device is connected to the filter for transferring an output of the filter into a corresponding audio signal.

It is an advantage of the claimed invention that said invention does not need the encoder and the decoder installed, as was the case with the prior art. This invention only needs to have the simple and cheap median filter installed. The median filter can efficiently filter out the erroneous data within the digital audio signal, thereby decreasing popping sounds and increasing the acoustic fidelity. The said invention also decreases the cost of the audio system.

These and other objectives of present invention will no doubt become obvious to those of ordinary skill in the art after reading the following detailed description of the preferred embodiment which is illustrated in the various figures and drawings.

DETAILED DESCRIPTION

Figure 1:
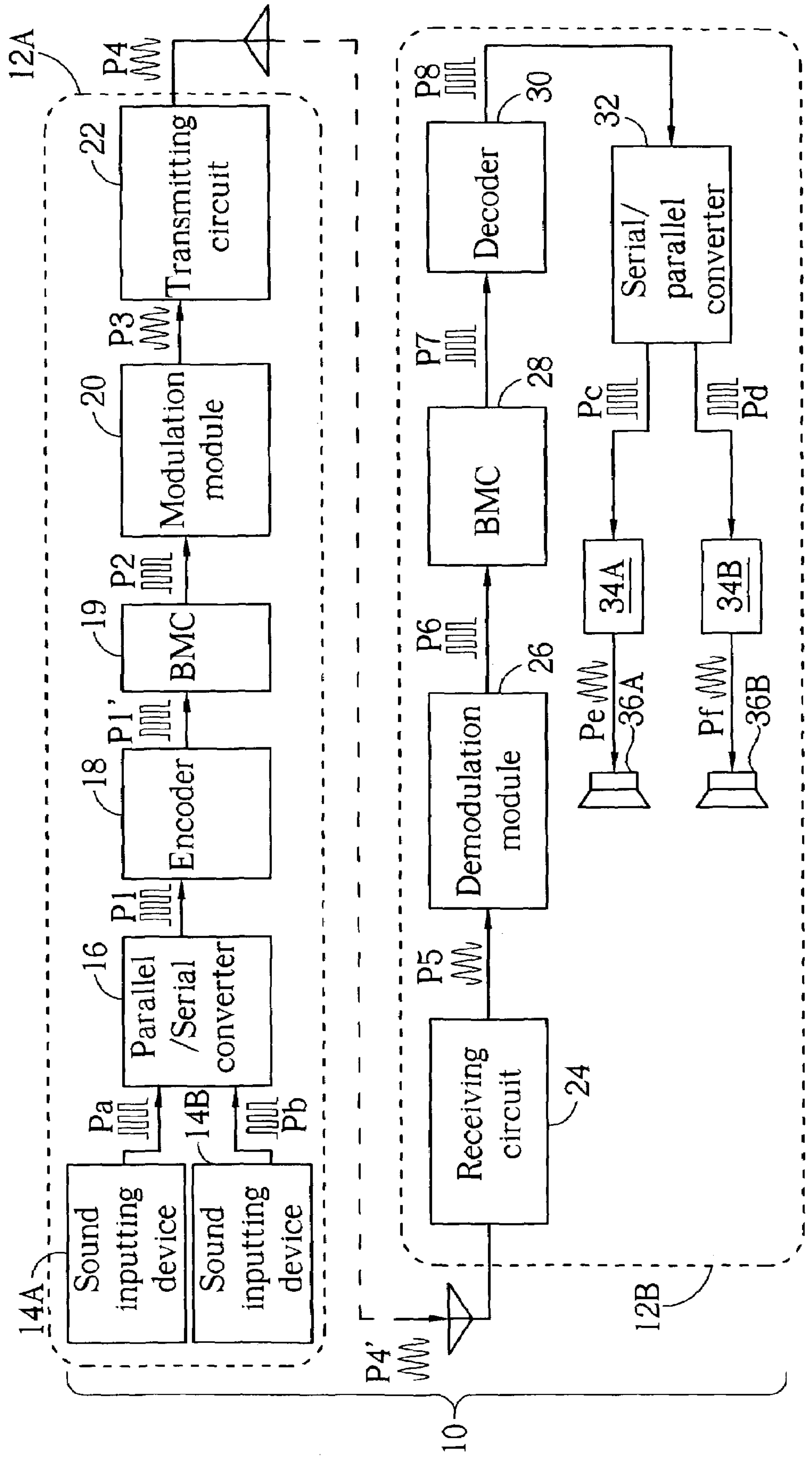
Fig. 1 Prior art
FIG. 1 is a functional block diagram of a prior art wireless audio system.
Figure 2:
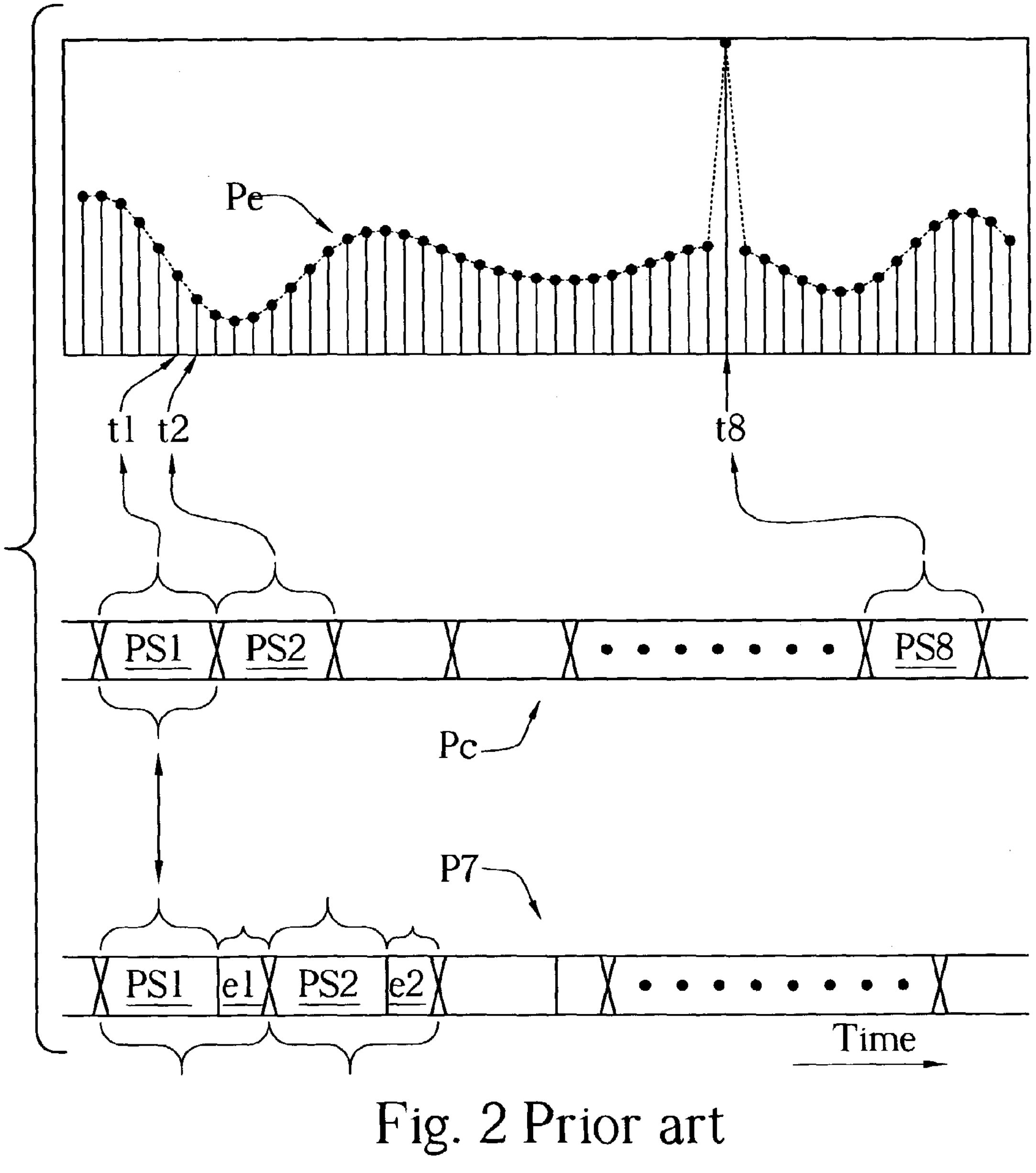
Fig. 2 Prior art
FIG. 2 is a clock diagram of signals of the audio system shown in FIG. 1.
Figure 3:
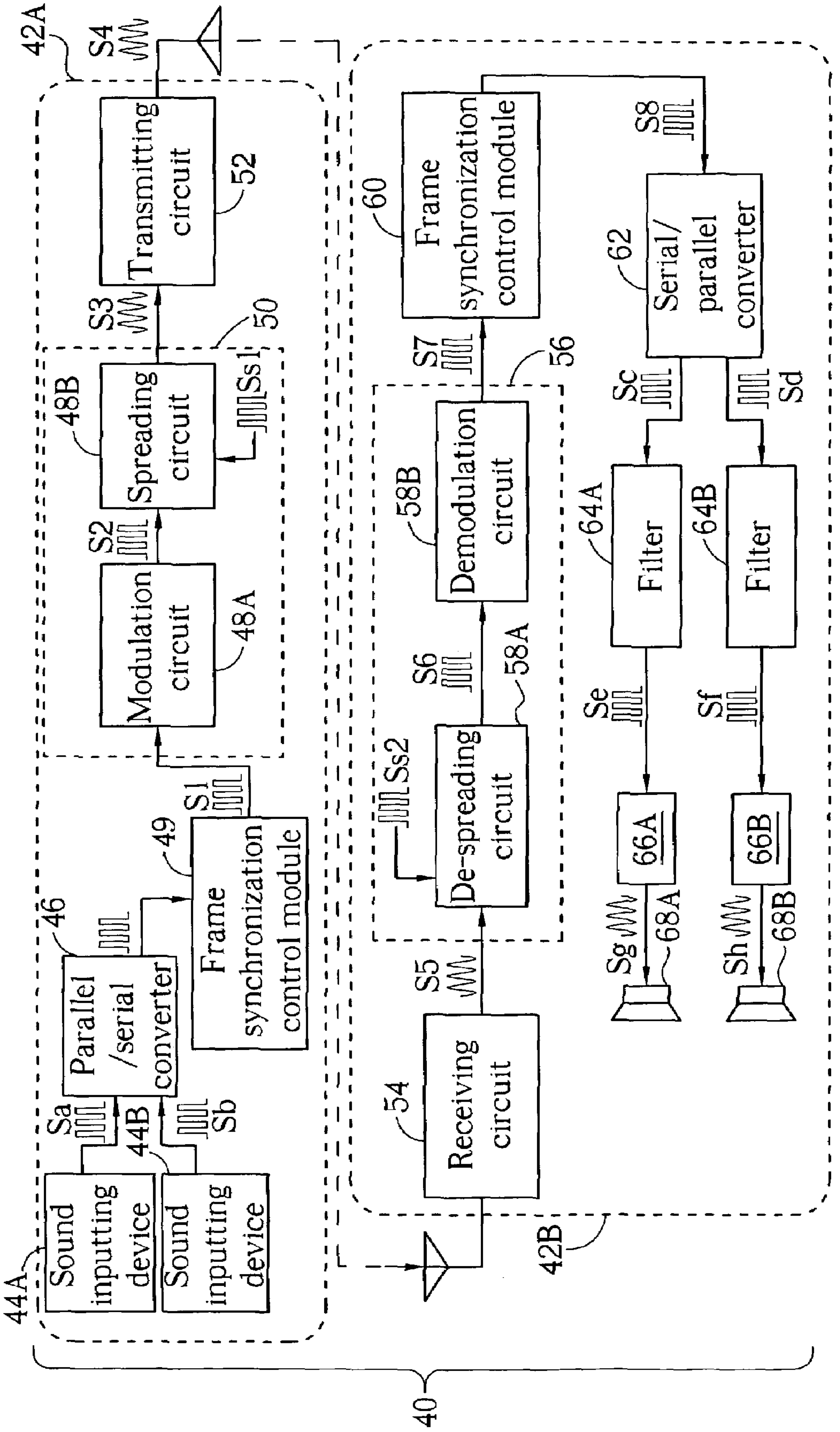
FIG. 3 is a functional block diagram of the present invention wireless audio system.

Please refer to FIG. 3, which is a functional block diagram of the present invention wireless audio system 40. The audio system 40 includes a transmitting apparatus 42A and a receiving apparatus 42B. The transmitting apparatus 42A includes two sound inputting devices 44A, 44B, a parallel/serial converter 46, a frame synchronization control module 49, a modulation module 50, and a transmitting circuit 52. The modulation module 50 includes a modulation circuit 48A and a spreading circuit 48B. The receiving apparatus 42B includes a receiving circuit 54, a demodulation module 56, a frame synchronization control module 60, a serial/parallel converter 62, two filters 64A, 64B for different audio channels, two audio converter devices 66A, 66B for the said different audio channels, and two speakers 68A, 68B for the said different audio channels. The demodulation module 56 includes a de-spreading circuit 58A and demodulation circuit 58B. Both of the sound inputting devices 44A, 44B for the said different audio channels, each device has a microphone and an analog to digital converter (ADC) respectively installed for converting the analog audio signal into the digital audio signal. The sound inputting devices 44A, 44B can obtain the digital audio signal from other sound sources (such as from a music CD). The speakers 68A, 68B can be earphones.

The sound inputting devices 44A, 44B generates digital signals Sa, Sb and outputs the digital signals Sa, Sb to the parallel/serial converter 46. The parallel/serial converter 46 arranges the digital signals Sa, Sb of two different audio channels into a single sequential digital signal and transmits this sequential digital signal to the frame synchronization control module 49. The frame synchronization control module 49 controls the clock of the digital signal and synchronizes the digital signal so as to form a digital signal S1. The digital signal S1 is transmitted to the modulation module 50. The modulation circuit 48A of the modulation module 50 can be a pi/4-DQPSK modulation circuit so as to modulate the digital signal S1 into a digital signal S2. The spreading circuit 48B performs convolution and multiplication operations on the digital signal S2 and a spreading code Ss1 so as to form a baseband signal S3. The spreading circuit 48B can make use of direct-sequence spread spectrum (DSSS). That means each bit of the digital signal S2 is represented by several bits. The baseband signal S3 is outputted to the transmitting circuit 52. The transmitting circuit 52 converts the baseband signal S3 into a radio frequency signal S4 and transmits the radio frequency signal S4 via air transmission.

When the receiving apparatus 42B receives the radio frequency signal S4, the receiving circuit 54 transforms the radio frequency signal S4 into a baseband signal S5 and transmits the baseband signal S5 to the demodulation module 56. The de-spreading circuit 58A of the demodulation module 56 performs de-spreading on the baseband signal S5 (performs the convolution and multiplication operations on the baseband signal S5 and a spreading code Ss2) so as to generate a digital signal S6. The demodulation circuit 58B performs the inverse operation of the modulation circuit 48A so as to demodulate the digital signal S6 into a digital signal S7. The digital signal S7 is transmitted to the frame synchronization control module 60. The frame synchronization control module 60 controls the clock of the digital signal S7 and synchronizes the digital signal S7 so as to generate a digital signal S8. The digital signal S8 is transmitted to the serial/parallel converter 62. The serial/parallel converter 62 splits the digital signal S8 into two digital signals Sc, Sd respectively for different audio channels. The filters 64A, 64B filter the digital signals Sc, Sd so as to generate corresponding digital signals Se, Sf. Finally, the audio conversion devices 66A, 66B respectively transform the digital signals Se, Sf into analog audio signals Sg, Sh and transmit the analog audio signals Sg, Sh to the speakers 68A, 68B. The speakers 68A, 68B transmit the acoustic wave corresponding to the analog audio signals Sg, Sh. The audio conversion devices 66A, 66B can be digital to analog converters (DACs). In addition, it is noteworthy that each of the frame synchronization control modules 49, 60 can be a burst mode controller (BMC).

Figure 4:
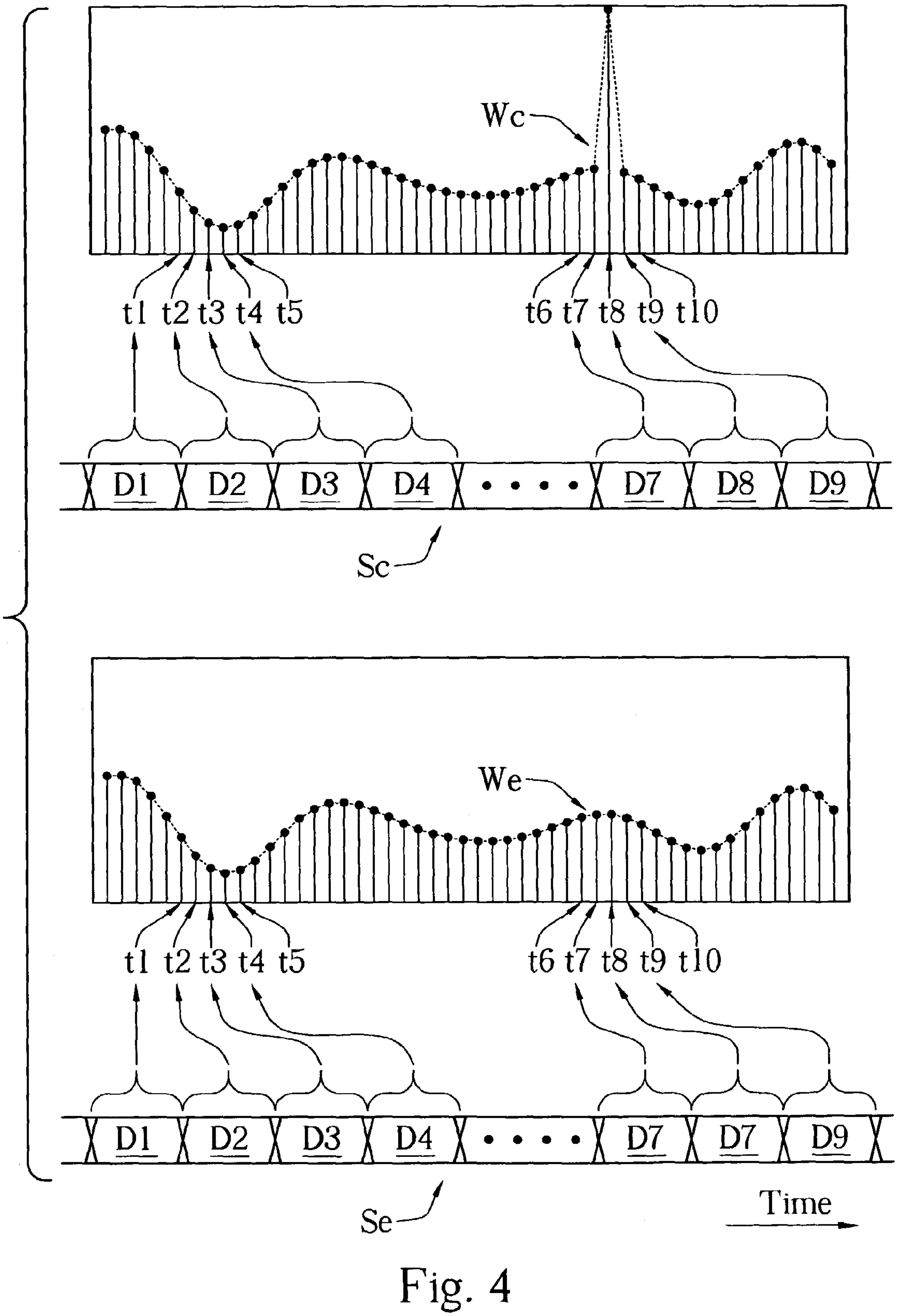
FIG. 4 is a clock diagram of each related signal of the present invention apparatus.

FIG. 3 shows that the primary difference from the prior art is that the present invention uses the filters 64A, 64B instead of the prior art encoder and decoder so as to filter out the erroneous data of the different audio channel digital signals Sc, Sd. The present invention uses simple median filters to be the filters 64A, 64B. Please refer to FIG. 4. FIG. 4 is a clock diagram of each related signal of the present invention apparatus. The horizontal axis of FIG. 4 represents time. The following uses the filter 64A as an example so as to illustrate the operating principle of the median filter. The operating principle of the filter 64B is same as that of the filter 64A. Similar to the prior art receiving apparatus 12B, the present invention receiving apparatus 42B also uses the sequential data of the digital signal to represent the amplitude value (sample value) of the analog waveform on each data samples. The analog waveform corresponding to the digital signal Sc, which inputted to the filter 64A, is a waveform Wc shown in FIG. 4. The vertical axis represents the amplitude of the waveform Wc. The analog waveform corresponding to the digital signal Se, which is processed by the filter 64A, is a waveform We shown in FIG. 4. The vertical axis represents the amplitude of the waveform We.

As shown in FIG. 4, each data (always is eight-bit length) within the digital signal Sc corresponds to the sample value of the waveform Wc on each data sample. A data D1 corresponds to the amplitude of the waveform Wc at time t1. A data D2 corresponds to the amplitude of the waveform Wc at time t2. Data D3, D4 and D7, D8, D9 simultaneously correspond to the amplitudes of the waveform Wc at times t3, t4 and t7, t8, t9. The relation between the digital signal Se and the waveform We is similar to the relation between the digital signal Sc and the waveform Wc. The abovementioned radio signal is influenced by noise during the transmission process. Therefore the digital signal Sc received and processed by the receiving apparatus 42B will carries erroneous data, so that the sound outputted from the speakers has popping sounds. For example, the data D8 within the digital data Sc is erroneous data. This erroneous data causes the waveform Wc to have a protruding wave at time t8. The filter 64A uses the function of the median filter to filter out the erroneous data within the digital signal Sc so as to generate the digital data Se. In the present embodiment, when the median filter wants to update a protruding data, the median filter uses the median value data of three successive data samples (the data itself, and the former data of the data, and latter data of the data) instead of the original data. That means the data that has the maximum sample value or the data that has the minimum sample value are replaced by the data with median sample value, so as to filter out the erroneous data. For example, when the filter 64A processes the data D2 corresponding to time t2, the filter 64A compares the value of the data D1, D2, D3 (corresponding to time t1, t2, t3). That means comparing the sample values of the three data samples of the waveform Wc at times t1, t2, t3. The waveform Wc shows that the amplitude at time t2 is between the amplitude at time t1 and t3. Regarding the data D2 of the digital signal Sc, the median filter still outputs data D2 in digital signal Se. After finishing processing the data D2 at time t2, the median filter processes the data D3 corresponding to time t3 within the digital signal Sc. At this time the median filter compares the value of data D2 (the former data), D3 and D4 (the latter data). After comparing, the median filter outputs the median value data D3 to the digital signal Se. Then the median filter continues and processes the data D4 corresponding to time t4 within the digital signal Sc. The analog signal is sampled as digital signal, the sampling frequency is usually higher than a Nyquist frequency of the analog signal. That means an interval between the data samples is very small. The sample values of two neighboring data samples do not have large change. In normal situations, if there is no erroneous data within the audio signal, the filtering data is equal to the median value when it is compared with the former data and the latter data. With regards to the waveform Wc and waveform We shown in FIG. 4, there is no erroneous data before time t7, meaning that the waveform Wc is same as the waveform We.

When the median filter processes the data D7 corresponding to time t7 within the digital signal Sc, the filter compares the data D6, D7, D8 corresponding to time t6, t7, t8. Since there is no erroneous data, the filter still sends the data D7 in the digital signal Se. Then the median filter processes the data D8 at time t8 within the digital signal Sc. The median filter compares the data of D7 (the former data), D8, D9 (the latter data). After comparing, the media filter transmits the median value data D7 to the digital data Se. Therefore the data within the digital data Se at time t8 is changed to D7, but not the original data D8 within the digital data Sc. Thus, the erroneous data D8 corresponding to time t8 within the digital signal Sc is filtered out by the median filter. The median filter continues to process the data D9 corresponding to time t9 within the digital signal Sc and transmits the median value data D9 to the digital signal Se. The waveform Wc and waveform We shown in FIG. 4 show that the median filter really can filter out the erroneous data from the audio signal so as to make the waveform much more smooth. The filtered digital signals Se are transmitted to the audio conversion device 66A. The audio conversion device 66A transforms the digital data Se into the audio signal and transmits the audio signal to the speaker 68A. The speaker 68A transmits the acoustic wave corresponding to the audio signal. Since the erroneous data has been filtered out by the median filter, users will no longer hear the popping sounds.

In conclusion, if the data samples do not have erroneous data, the sample values of two successive data samples do not have large change. The filtering data is the same as the median value data when comparing the filtering data with the former data and the latter data. In this situation, the median filter maintains the original waveform. However, when the sample value of one data sample suddenly becomes higher or lower, that means this data sample is an erroneous data. In this invention, the erroneous data is not the median value data when comparing with the former data and the latter data. The median filter chooses the former data or the latter data instead of this erroneous data so as to make the waveform of the output signal much more smooth, thereby preventing the popping sounds.

Figure 5:
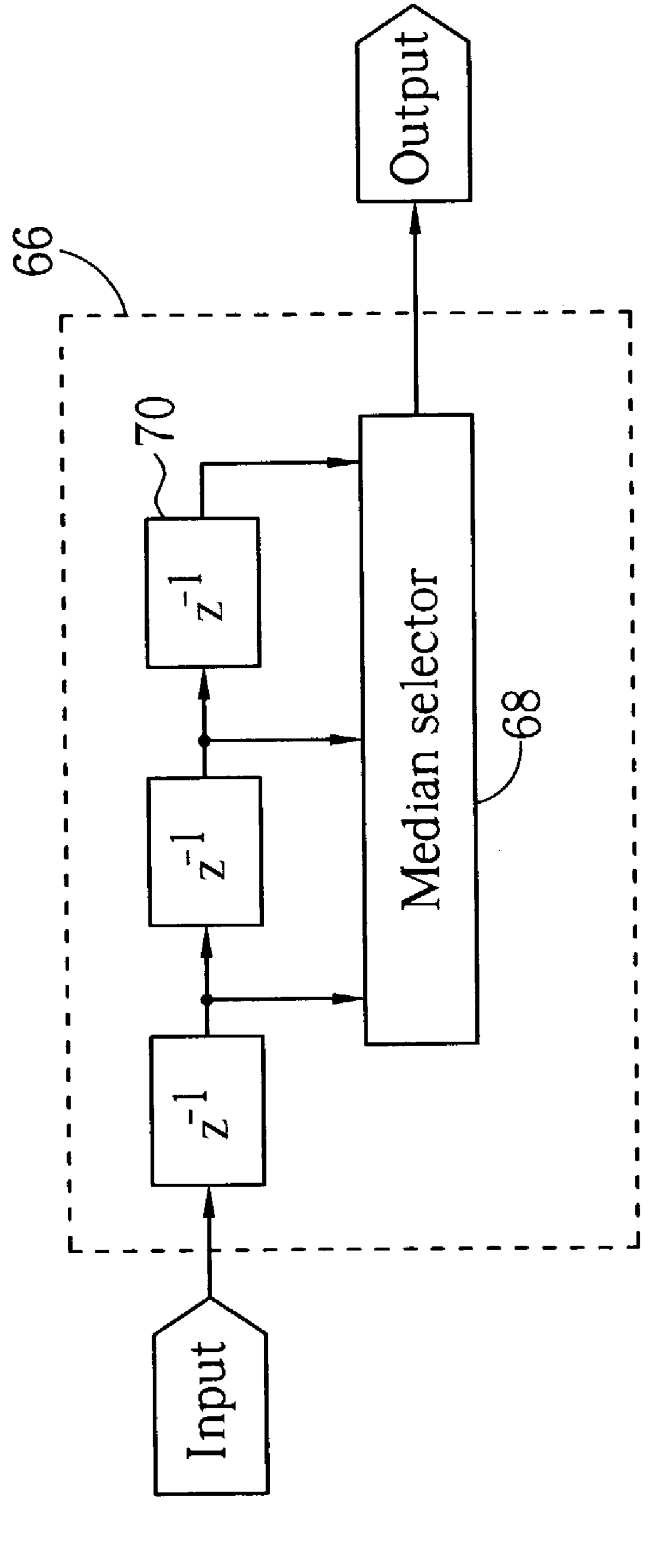
FIG. 5 is a functional block diagram of a present invention filter.

Please refer to FIG. 5, which is a functional block diagram of the present invention filters 64A, 64B. The median filter will be used as an example. The median filter 66 shown in FIG. 5 has three delay units 70. The function of each delay unit is to perform$z^{-1}$ operation. The three delay units 70 can obtain three successive data samples from the inputted digital signal. The three successive data samples are transmitted into the median value selector 68 so as to choose the median value data and output the median value data. Since the probability that two successive data samples both contain erroneous data is very small, the present invention median filter which compares three successive data samples and outputs the median value data can efficiently filter out the erroneous data. Of course, the present invention median filter can also use a median filter which compares five (or more) successive data samples. The median filter which compares five successive data samples, compares the data itself, the former two data, and the latter two data so as to obtain the median value data. In which, this median filter has five delay units.

In contrast to the prior art audio system which uses the complicated encoder and decoder to add the error protection code so as to filter out the erroneous data, the present invention audio system uses the simple median filter to filter out the erroneous data. The transmitting apparatus of the present invention wireless audio system does not need the encoder installed, and the receiving apparatus also does not need the decoder installed. The present invention only needs two simple and inexpensive median filters installed for different audio channels so as to efficiently filter out the erroneous data within the digital signal, thereby decreasing the occurrence of popping sounds and increasing the acoustic fidelity. The present invention can be used not only in wireless audio systems which have frequency bands between 2.4 GHz to 2.5 GHz, but also can be used in frequency bands between 5.15 GHz to 5.35 GHz. Since these frequency bands are commonly used by people, these signals are easily influenced by noise. The present invention can efficiently filter out the erroneous data generated during the transmission process with low cost, and decrease the popping sounds. Since the wireless transmission signals do not need to have error protection codes added, the load of the wireless transmission is decreases. The abovementioned embodiment used the wireless audio system as an example. However, the present invention is not limited to that. The present invention can be used in general digital audio systems to filter out the erroneous data within digital signals so as to increase the acoustic fidelity.

Those skilled in the art will readily observe that numerous modifications and alterations of the apparatus may be made while retaining the teachings of the invention. Accordingly, the above disclosure should be construed as limited only by the metes and bounds of the appended claims.

What is claimed is:

1. An apparatus for enhancing audio quality of an audio system comprising:
 - a receiving circuit for receiving a radio frequency signal and generating a corresponding baseband signal;
 - a demodulation module electrically connected to the receiving circuit for demodulating the baseband signal and correspondingly outputting sequential digital data;
 - a filter electrically connected to the demodulation module for filtering out erroneous digital data outputted from the demodulation module; and
 - an audio conversion device electrically connected to the filter for transferring an output of the filter into a corresponding audio signal.

2. The apparatus of claim 1 wherein the demodulation module comprises a demodulation circuit to demodulate the baseband signal.

3. The apparatus of claim 2 wherein the demodulation module further comprises a de-spreading circuit to generate a de-spreading signal through performing a convolution and multiplication operations with the baseband signal and a de-spreading code, and the demodulation circuit demodulates the de-spreading signal.

4. The apparatus of claim 1 wherein the sequential data is sequential data bits.

5. The apparatus of claim 4 further comprising a frame synchronization control module positioned between the demodulation module and the filter for synchronizing the sequential data bits and outputting the sequential data bits.

6. The apparatus of claim 5 further comprising a serial /paralled converter positioned between the frame synchronization control module and the filter for splitting the sequential data bits into a plurality of data samples.

7. The apparatus of claim 6 wherein each data sample has a sample value.

8. The apparatus of claim 7 wherein the filter is a median filter used for comparing at least three successive sample values simultaneously, abandoning a maximum sample value and a minimum sample value among the selected sample values, and selecting the sample value with a median value out of the residual sample values.

9. The apparatus of claim 6 wherein the serial/parallel converter can split the sequential data bits for generating audio signals transmitted via a left channel and a right channel simultaneously.

10. The apparatus of claim 5 wherein the frame synchronization control module is a burst mode controller (BMC).

11. The apparatus of claim 1 comprising two combination sets of the filter and the audio conversion device for handling audio signals transmitted via a left channel and audio signals transmitted via a right channel respectively.

12. An audio system comprising:

a transmitting apparatus comprising:

a sound inputting module for receiving at least a sound signal and transforming the sound signal into a digital signal;

a modulation module electrically connected to the sound inputting module for modulating the digital signal into a first baseband signal; and a transmitting circuit electrically connected to the modulation module for transforming the first baseband signal into a radio frequency signal and outputting the radio frequency signal via wireless transmission; and a receiving apparatus comprising:

a receiving circuit for receiving the radio frequency signal and generating a second baseband signal corresponding to the first baseband signal;

a demodulation module electrically connected to the receiving circuit for demodulating the second baseband signal and correspondingly outputting sequential digital data;

a filter electrically connected to the demodulation module for filtering out erroneous digital data outputted from the demodulation module; and an audio conversion device electrically connected to the filter for transforming data outputted from the filter into a corresponding audio signal.

13. The audio system of claim 12 wherein the sound inputting module comprises:

a plurality of sound inputting devices each for receiving the sound signal transmitted via a channel and transforming the sound signal into the corresponding digital signal; and a parallel/serial converter electrically connected to the sound inputting devices for encapsulating the digital signals individually generated from the sound inputting devices into a sequential digital signal.

14. The audio system of claim 12 wherein the transmitting apparatus further comprises a frame synchronization control module electrically connected between the sound inputting module and the modulation module for synchronizing and outputting the digital signal generated from the sound inputting module.

15. The audio system of claim 14 wherein the frame synchronization control module is a burst mode controller (BMC).

16. The audio system of claim 14 wherein the modulation module comprises:

a modulation circuit electrically connected to the BMC for modulating the digital signal; and a spreading circuit electrically connected to the modulation circuit for generating the first baseband signal through performing convolution and multiplication operations with a spreading code and the digital signal outputted from the modulation circuit.

17. The audio system of claim 11 wherein the demodulation module comprises a de-spreading circuit for generating a de-spreading signal through performing convolution and multiplication operations with the second baseband signal and a de-spreading code, and a demodulation circuit for demodulating the de-spreading signal.

18. The audio system of claim 12 wherein the sequential data is sequential data bits.

19. The audio system of claim 18 wherein the receiving apparatus further comprises a frame synchronization control module positioned between the demodulation module and the filter for synchronizing and outputting the sequential data bits outputted from the demodulation module.

20. The audio system of claim 19 wherein the receiving apparatus further comprises a serial/parallel converter positioned between the frame synchronization control module and the filter for splitting sequential data into a plurality of data samples, and each data sample has a sample value.

21. The audio system of claim 20 wherein the filter is a median filter used for comparing at least three successive sample values simultaneously, abandoning a maximum sample value and a minimum sample value among the selected sample values, and selecting the sample value with a median value out of the residual sample values.

22. The audio system of claim 20 wherein the serial/parallel converter can split the sequential data for generating audio signals transmitted via a left channel and a right channel simultaneously.

23. An apparatus for enhancing audio quality of an audio system comprising:

a receiving circuit for receiving a radio frequency signal and generating a corresponding baseband signal;

a demodulation module electrically connected to the receiving circuit for demodulating the baseband signal and correspondingly outputting sequential data, wherein the sequential data is sequential data bits;

a filter electrically connected to the demodulation moduic for filtering out erroneous data outputted from the demodulation module;

a frame synchronization control module positioned between the demodulation module and the filter for synchronizing the sequential data bits and outputting the sequential data bit; and an audio conversion device electrically connected to the filter for transferring an output of the filter into a corresponding audio signal.

24. An audio system comprising:

a transmitting apparatus comprising:

a sound inputting module for receiving at least a sound signal and transforming the sound signal into a digital signal;

a modulation module electrically connected to the sound inputting module for modulating the digital signal into a first baseband signal;

a frame synchronization control module electrically connected between the sound inputting module and the modulation module for synchronizing and outputting the digital signal generated from the sound inputting module; and a transmitting circuit electrically connected to the modulation module for transforming the first baseband signal into a radio frequency signal and outputting the radio frequency signal via wireless transmission; and a receiving apparatus comprising:

a receiving circuit for receiving the radio frequency signal and generating a second baseband signal corresponding to the first baseband signal;

a demodulation module electrically connected to the receiving circuit for demodulating the second baseband signal and correspondingly outputting sequential data;

a filter electrically connected to the demodulation module for filtering out erroneous data outputted from the demodulation module; and an audio conversion device electrically connected to the filter for transforming data outputted from the filter into a corresponding audio signal.

25. An audio system comprising:

a transmitting apparatus comprising:

a sound inputting module for receiving at least a sound signal and transforming the sound signal into a digital signal;

a modulation module electrically connected to the sound inputting module for modulating the digital signal into a first baseband signal; and a transmitting circuit electrically connected to the modulation module for transforming the first baseband signal into a radio frequency signal and outputting the radio frequency signal via wireless transmission; and a receiving apparatus comprising:

a receiving circuit for receiving the radio frequency signal and generating a second baseband signal corresponding to the first baseband signal;

a demodulation module electrically connected to the receiving circuit for demodulating the second baseband signal and correspondingly outputting sequential data, wherein the sequential data is sequential data bits;

a filter electrically connected to the demodulation module for filtering out erroneous data outputted from the demodulation module;

a frame synchronization control module positioned between the demodulation module and the filter for synchronizing and outputting the sequential data bits outputted from the demodulation module; and an audio conversion device electrically connected to the filter for transforming data outputted from the filter into a corresponding audio signal.

* * * * *